US012687821B2

(12) United States Patent (10) Patent No.: US 12,687,821 B2
Ren et al. (45) Date of Patent: Jul. 21, 2026

(54) ELECTRONIC DEVICE

(71) Applicant: GOERTEK TECHNOLOGY CO., LTD., Qingdao (CN)

(72) Inventors: Jianlei Ren, Qingdao (CN); Jian Feng, Qingdao (CN); Junjie Pan, Qingdao (CN); Huan Li, Qingdao (CN); Yulong Shi, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 301 days.

(21) Appl. No.: 18/621,282

(22) Filed: Mar. 29, 2024

(65) Prior Publication Data

US 2024/0241481 A1 Jul. 18, 2024

Related U.S. Application Data

(63) Continuation of application No. PCT/CN2022/103061, filed on Jun. 30, 2022.

(30) Foreign Application Priority Data

Dec. 30, 2021 (CN) .......................... 202111660505.7

(51) Int. Cl.
G04G 17/04 (2006.01)
G04G 17/08 (2006.01)
G06F 3/0362 (2013.01)

(52) U.S. Cl.
CPC ........... G04G 17/045 (2013.01); G04G 17/08 (2013.01); G06F 3/0362 (2013.01)

(58) Field of Classification Search
CPC .... G04G 17/08; G04G 17/045; G06F 3/0362; A61B 5/00
See application file for complete search history.

(56) References Cited

U.S. PATENT DOCUMENTS 2,989,838 A * 6/1961 Guggi ................ G04B 37/0008
968/295
5,490,123 A * 2/1996 Biver ................... G04B 47/046
368/294
(Continued)

FOREIGN PATENT DOCUMENTS

CN 107111342 A 8/2017
CN 108037655 A 5/2018
(Continued)

OTHER PUBLICATIONS

Second Office Action in Corresponding Chinese Application No. 202111660505.7, dated Jul. 20, 2024; 38 pgs.
(Continued)

*Primary Examiner* — Sean Kayes
(74) *Attorney, Agent, or Firm* — HAUPTMAN HAM, LLP

(57) ABSTRACT

Disclosed are an electronic device including a shell, a rotating frame, a guide limit mechanism, a sensor and a controller. The rotating frame is rotatably provided outside a part of the shell and configured to rotate to at least two gears relative to the shell. In response to that the rotating frame rotates to any one of the gears, the rotating frame is snap-fitted with the shell for positioning through a gear limit mechanism; and in response to that the rotating frame is rotated out of the gears by an external force, the rotating frame is released from the shell. The guide limit mechanism is configured to limit a rotation range of the rotating frame. The sensor is configured to sense a current rotation gear of the rotating frame and connected to the controller which is configured to control and perform a corresponding function according to the current rotation gear.

18 Claims, 6 Drawing Sheets

(56)                References Cited

U.S. PATENT DOCUMENTS

| | | | | |
|---|---|---|---|---|
| 6,761,479 | B2 * | 7/2004 | Meyrat | .............. G04B 37/0008 |
| | | | | 368/310 |
| 9,753,434 | B2 * | 9/2017 | Kobayashi | ........... G04B 19/225 |
| 11,126,142 | B2 * | 9/2021 | Wahler | ................. G04B 19/286 |
| 11,353,829 | B2 * | 6/2022 | Meyer | .................... G04G 17/02 |
| 2006/0114753 | A1 * | 6/2006 | Gerber | ................ G04B 19/283 |
| | | | | 368/295 |
| 2015/0346692 | A1 * | 12/2015 | Bolzt | ..................... G04B 37/04 |
| | | | | 29/244 |
| 2016/0109853 | A1 * | 4/2016 | Kobayashi | ............. G04B 19/18 |
| | | | | 368/295 |
| 2017/0277125 | A1 | 9/2017 | Jung et al. | |
| 2018/0307333 | A1 | 10/2018 | Lim et al. | |
| 2019/0146422 | A1 * | 5/2019 | Meyer | .................... G04C 3/004 |
| | | | | 368/185 |
| 2020/0064774 | A1 | 2/2020 | Ely et al. | |

FOREIGN PATENT DOCUMENTS

| | | |
|---|---|---|
| CN | 109313413 A | 2/2019 |
| CN | 208741656 U | 4/2019 |
| CN | 110716417 A | 1/2020 |
| CN | 110989322 A | 4/2020 |
| CN | 112305902 A | 2/2021 |
| CN | 213365273 U | 6/2021 |
| CN | 113555241 A | 10/2021 |
| CN | 113725030 A | 11/2021 |
| CN | 114355755 A | 4/2022 |
| CN | 217404738 U | 9/2022 |

OTHER PUBLICATIONS

First Office Action in Corresponding Chinese Application No. 202111660505.7, dated Jan. 23, 2024; 18 pgs.

International Search Report and Written Opinion in Corresponding International Application No. PCT/CN2022/103061, mailed Sep. 7, 2022; 14 pgs.

Grant Notification in Corresponding Chinese Application No. 202111660505.7, dated Oct. 18, 2024; 9 pgs.

* cited by examiner

ELECTRONIC DEVICE

CROSS-REFERENCE TO RELATED APPLICATIONS

The present application is a continuation application of International Application No. PCT/CN2022/103061, filed on Jun. 30, 2022, which claims priority to Chinese Patent Application No. 202111660505.7, filed on Dec. 30, 2021. The disclosures of the above-mentioned applications are incorporated herein by reference in their entireties.

TECHNICAL FIELD

The present application relates to the technical field of electronic products, and in particular, to an electronic device.

BACKGROUND

Technology is developing at a rapid pace, especially consumer electronic devices. On the premise of satisfying basic functions, people are increasingly pursuing product aesthetics, interactive diversity, and comfortable wearing experience.

At present, smart watch interaction is generally completed by touching the screen or touching the screen and rotating buttons. This interaction method is relatively simple. If you need to find a common function, the search operation is more cumbersome. In addition, watches with rotating buttons are often inconvenient to operate because the rotating buttons are small, seriously affecting the user experience. Furthermore, the rotating buttons are small or the rotation is inaccurate, which may cause inaccurate control effects. During the use process, it brings more inconvenience to the user and results in a bad user experience.

To sum up, how to make the electronic device realize convenient interaction and easy operation while ensuring the operation accuracy is an urgent problem that needs to be solved by those skilled in the art.

SUMMARY

The main purpose of the present application is to provide an electronic device. The rotating frame of the electronic device can be rotated to several gears and the gear limit mechanism is configured to limit the position. Limiting the rotation avoids inaccurate control caused by excessive operation, and corresponding functions according to the current gear of the rotating frame can be performed accurately. The electronic device can be controlled precisely and operated easily, enabling convenient, fast and precise control.

In order to achieve the above purpose, the present application provides an electronic device, including:

a shell;

a rotating frame rotatably provided outside a part of the shell, wherein the rotating frame is configured to rotate to at least two gears relative to the shell; in response to that the rotating frame rotates to any one of the gears, the rotating frame is snap-fitted with the shell for positioning through a gear limit mechanism; and in response to that the rotating frame is rotated out of the gears by an external force, the rotating frame is released from the shell;

a guide limit mechanism including a guide limit groove and a guide limit protrusion slidably provided in the guide limit groove, wherein one of the guide limit groove and the guide limit protrusion is relatively fixed to the shell, and the other of the guide limit groove and the guide limit protrusion is provided on the rotating frame to limit a rotation range of the rotating frame; and a sensor and a controller, wherein the sensor is configured to sense a current rotation gear of the rotating frame; the sensor is connected to the controller, and the controller is configured to control and perform a corresponding function according to the current rotation gear.

In some embodiments, a lubricating piece is provided on a side of the shell facing the rotating frame.

In some embodiments, a handle or an anti-slip pattern is provided on a side of the rotating frame to facilitate rotating.

In some embodiments, a central angle between two adjacent gears around the rotating frame is configured to range from 25 degrees to 45 degrees.

In some embodiments, the rotating frame is provided with a magnetic component; the shell is provided with a three-axis hall sensor for detecting a rotation state of the rotating frame, and the three-axis hall sensor is connected to the controller.

In some embodiments, the rotating frame is sleeved on an outside of a first annular part of the shell; the first annular part is provided with a radial through hole, and the rotating frame is provided with a through hole corresponding to the radial through hole; a collar with a snap tab is detachably provided on an inner annular surface of the rotating frame, and in an installed state, the snap tab is inserted into the through hole of the first annular part and the through hole of the rotating frame in turn.

In some embodiments, the collar is an arc-shaped elastic clamping member; each collar is provided with at least two snap tabs, and the at least two snap tabs are provided sequentially along a length direction of the arc-shaped elastic clamping member.

In some embodiments, the rotating frame is provided with at least one physiological monitoring electrode and at least one rotating frame conductive member correspondingly connected to the at least one physiological monitoring electrode; the shell is provided with a physiological monitoring circuit, and the shell is provided with at least one shell conductive member connected to the physiological monitoring circuit;

in response to that the rotating frame rotates to a gear for physiological monitoring, the rotating frame conductive member is connected to the shell conductive member; and in response to that the rotating frame rotates out of the gear for physiological monitoring, the rotating frame conductive member is disconnected to the shell conductive member.

In some embodiments, the electronic device is a smart watch including a display screen; the display screen is provided on the shell, and the rotating frame is configured to surround the display screen.

In some embodiments, the gears include a first gear for performing a first function, a second gear for performing a second function, and a third gear for performing a third function.

In some embodiments, the first function is a payment function, the second function is a physiological monitoring function, and the third function is a sports mode.

In some embodiments, the gear limit mechanism includes an elastic module and a groove snap-fitted with the elastic module; one of the elastic module and the groove is provided on the shell, and the other of the elastic module and the groove is provided on the rotating frame;

the elastic module is divided into at least one elastic module group and the groove is divided into at least two groove groups to correspond to different gears; or the groove is divided into at least one groove group and the elastic module is divided into at least two elastic module groups to correspond to different gears; and in response to that the rotating frame rotates to any one of the gears, an elastic module is snap-fitted with a corresponding groove.

In some embodiments, each elastic module group includes two elastic modules centrosymmetric about a rotation axis of the rotating frame; and each groove group includes two grooves centrosymmetric about the rotation axis of the rotating frame.

In some embodiments, the elastic module is provided on the shell, and the groove is provided on the rotating frame; or the elastic module is provided on the rotating frame, and the groove is provided on the shell.

In some embodiments, the elastic module includes a spring and a ball; one end of the spring is provided on the shell or in a slot of the rotating frame, and the other end of the spring is connected to the ball; the ball is configured to snap into the groove; or the elastic module includes a spring piece; one end of the spring piece is provided on the shell or the rotating frame, and the other end of the spring piece is configured to snap into the groove.

In some embodiments, the guide limit groove and the gear limit mechanism are alternately provided along a circumferential direction of the rotating frame.

In some embodiments, a central angle of the guide limit groove is equal to a rotation central angle between two farthest gears around the rotating frame.

In some embodiments, two guide limit protrusions are provided centrosymmetric about a rotation axis of the rotating frame, and two guide limit grooves are provided centrosymmetric about the rotation axis of the rotating frame; the guide limit protrusions and the guide limit grooves are snap-fitted in one-to-one correspondence.

In the electronic device provided by the present application, the rotation of the rotating frame relative to the shell is limited, and the rotation can be performed within a certain range or in a certain direction. Therefore, the states of the two can be limited to the greatest extent, ensuring that the rotating frame can rotate to the target gear position.

When the rotating frame rotates to the target gear relative to the shell, the sensor can send the sensed current rotation gear to the controller, and the controller can execute the operation content of the corresponding gear according to the current rotation gear. In this way, the operator can control the electronic device by rotating the rotating frame. If the rotating frame needs to be rotated from a gear to other angles, a certain rotation force needs to be applied. The gear limit mechanism adds a stuck effect to the rotation process of the rotating frame, creating an obvious operating experience.

The rotation process of the rotating frame of the electronic device can be limited by the stroke to ensure precise rotation, and after entering several gears, the position can be limited with the gear limit mechanism. The controller can perform corresponding functions according to the current gear position of the rotating frame. The electronic device can be controlled precisely and operated easily.

BRIEF DESCRIPTION OF THE DRAWINGS

In order to more clearly illustrate the technical solutions in the embodiments of the present application or in the related art, a brief introduction will be given to the accompanying drawings required in the description of the embodiments or the related art. Obviously, the accompanying drawings in the following description are only some embodiments of the present application. For those skilled in the art, other accompanying drawings can be obtained based on the structures shown in these drawings without any creative effort.

The realization of the purpose, functional characteristics and advantages of the present application will be further described with reference to the attached drawings in combination with embodiments.

DETAILED DESCRIPTION OF THE EMBODIMENTS

The technical solutions of embodiments of the present application will be clearly and completely described with reference to the drawings in the embodiments of the present application. Obviously, the described embodiments are only some rather than all of the embodiments of the present application. Based on the embodiments of the present application, all other embodiments obtained by those skilled in the art without creative efforts shall fall within the scope of the present application.

The present application is to provide an electronic device. The electronic device can enter several gears by rotating the rotating frame and limit gears position with the gear limit mechanism. The controller 7 can perform corresponding functions according to the current gear position of the rotating frame. The electronic device can be controlled precisely and operated easily.

As shown in FIG. 1 to FIG. 15, the present application provides an electronic device. The electronic device can be a wearable electronic device such as a smart watch, a smart bracelet, a smart ring, a smart necklace, a head-mounted display, or smart glasses, or it can also be a locator, a mobile phone, a smart speaker, a game controller, etc. The electronic device includes shell 5, a rotating frame 1, a gear limit mechanism, a sensor and a controller 7.

The shell 5 is configured to accommodate the main structure of the electronic device.

The rotating frame 1 is rotatably provided outside a part of the shell 5, and the rotating frame 1 is configured to rotate to at least two gears relative to the shell 5.

Figures 1, 2:
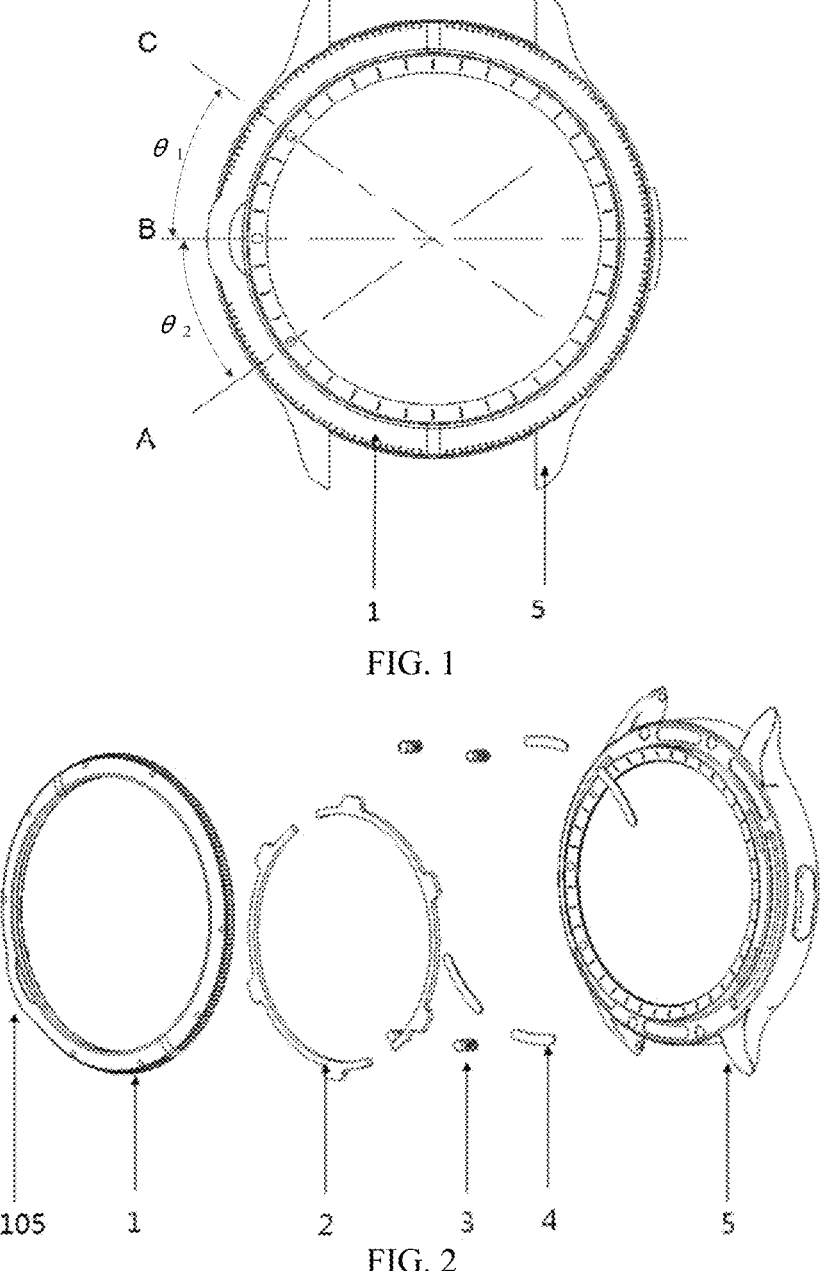
FIG. 1 is a schematic structural view of an electronic device according to some embodiments of the present application.
FIG. 2 is a schematic exploded view of the electronic device according to some embodiments of the present application.

As shown in FIG. 1 and FIG. 2, in response to that the rotating frame 1 rotates to any one of the gears, the rotating frame 1 is snap-fitted with the shell 5 for positioning through a gear limit mechanism; and in response to that the rotating frame 1 is rotated out of the gears by an external force, the rotating frame 1 is released from the shell 5. Therefore, during the rotation of the rotating frame 1, it can rotate to two or more gears with a snap-on positioning effect. When it is at such positioning position, an external force needs to be added to rotate to leave away from the current gear. Therefore, the rotation is accurate.

A guide limit mechanism includes a guide limit groove 502 and a guide limit protrusion 103 slidably provided in the guide limit groove 502. One of the guide limit groove 502 and the guide limit protrusion 103 is fixed to the shell 5, and the other is provided on the rotating frame 1. The guide limit groove 502 is configured to limit a rotation range of the guide limit protrusion 103, thereby limiting a rotation range of the rotating frame 1.

In addition, a sensor and a controller 7 is provided inside the shell 5, and the sensor is configured to sense a current rotation gear of the rotating frame 1; the sensor is connected to the controller 7, and the controller 7 is configured to control performing a corresponding function according to the current rotation gear.

The sensor can be a magnetic sensor, a light sensor, a mechanical switch, etc. For example, the optical pattern of the rotating frame 1 is identified through the light emitting part and the light receiving part of the light sensor to distinguish the current rotation gear of the rotating frame 1 and send the result to the controller 7. After the controller 7 obtains the current rotation gear, it executes the corresponding function according to the corresponding relationship between the gear and the function.

In the above structure, the rotation range of the rotating frame 1 relative to the shell 5 is limited, and can only rotate within a certain range or in a certain direction. Therefore, the states of the two can be limited to the greatest extent, ensuring that the rotating frame 1 can rotate to the target gear.

When the rotating frame 1 rotates to the target gear relative to the shell 5, the sensor can send the sensed current rotation gear to the controller 7, and the controller 7 executes the operation content of the corresponding gear according to the current rotation gear, such as quick payment, physiological monitoring, exercise mode, music playback, etc. The operator can control the electronic device by controlling the rotation of the rotating frame 1. At the same time, the above structure uses the gear limit mechanism to form at least two positioning snap points, that is, gears, during the rotation of the rotating frame 1. If the rotating frame 1 needs to be rotated from the gear to other angles, a certain rotation force needs to be applied. The gear limit mechanism produces a jamming effect to the rotation process of the rotating frame 1, forming an obvious operating experience.

Based on the above-mentioned embodiments, the gear limit mechanism includes an elastic module 3 and a groove 102 snap-fitted with the elastic module 3. One of the elastic module 3 and the groove 102 is provided on the shell 5, and the other is provided on the rotating frame 1. The elastic module 3 is provided in one of the shell 5 or the rotating frame 1. During the rotation of the rotating frame 1, the elastic module 3 is squeezed and is in a compressed state. When rotated to the groove 102, the elastic module 3 releases the elastic potential energy and snaps into the groove 102.

The elastic module 3 is divided into at least one elastic module group and the groove 102 is divided into at least two groove groups to correspond to different gears; or the groove 102 is divided into at least one groove group and the elastic module 3 is divided into at least two elastic module groups to correspond to different gears; and in response to that the rotating frame 1 rotates to any one of the gears, an elastic module group is snap-fitted with a corresponding groove group.

In some embodiments, the elastic module 3 and the groove 102 need to be provided on the opposite surfaces of the shell 5 and the rotating frame 1 respectively. When an end surface of the rotating frame 1 is in contact with an end surface of the shell 5, the elastic module 3 and the groove 102 can be respectively provided on the contact surfaces of the shell 5 and the rotating frame 1.

The above-mentioned elastic module 3 and groove 102 can also be on other surfaces. For example, when the rotating frame 1 and the shell 5 have an internal and external nesting structure, taking the inner annular surface of the rotating frame 1 being nested on the outer annular surface of the shell 5 as an example, the elastic module 3 and the groove 102 can be provided on the outer ring surface of the shell 5 and the inner ring surface of the rotating frame 1 respectively.

In addition, at least one of the elastic modules 3 and the grooves 102 has two groups. For example, when the elastic modules 3 are in one group and the grooves 102 are in four groups, during the circumferential rotation of the rotating frame 1, four groups of groove 102 which can make the elastic module 3 deformed are four gears that can position the rotating frame 1. When the rotating frame 1 rotates to these four positions, the controller 7 can perform corresponding functions.

In these embodiments, a plurality of groups of elastic modules 3 or a plurality of groups of grooves 102 are provided to form a plurality of gears in the circumferential direction. A plurality of groups of elastic modules 3 and grooves 102 can be provided at the same time. As long as the snap connection is achieved at the preset position.

It should be noted that the rotation of the rotating frame 1 in the present application can be a one-way rotation. If the rotation exceeds the target position or target gear during use, it needs to continue to rotate in the same direction until it reaches the target position; or the rotation of the rotating frame 1 is bidirectional, which can reduce the user's rotation operation process to a certain extent.

Based on any of the above embodiments, the number of gears may be three, which may be realized by a plurality of groups of elastic modules 3 or a plurality of groups of grooves 102. Such as, one group of elastic modules and three groups of grooves, two groups of elastic modules and six groups of grooves, three groups of elastic modules and one group of grooves, or six groups of elastic modules and two groups of grooves, etc.

The above-mentioned three gears can be a first gear for performing a first function, a second gear for performing a second function, and a third gear for performing a third function. Such three gears can be the same or different. For example, all the three gears are physiological monitoring functions, or the first function is a payment function, the second function is a physiological monitoring function, and the third function is a sports mode.

As shown in FIG. 1, during the rotation of the rotating frame 1, a predetermined position on the rotating frame 1 can be rotated to the A position, B position and C position successively, corresponding to the gear A, gear B and gear C respectively.

It should be noted that the above-mentioned functions and gears should be in one-to-one correspondence, that is, when rotating to a gear, the controller 7 should be able to uniquely perform one function.

Correspondingly, the shell 5 needs to be provided with functional modules that perform corresponding functions, such as microprocessors, communication devices, and sensors that perform physiological monitoring functions, such as heart rate sensors, electrocardiogram sensors, body fat sensors, body temperature sensors, and blood pressure sensors, oxygen sensors, etc. Sensors that measure motion information in sports mode can be acceleration sensors, gyroscopes, etc.

Based on any one of the above-mentioned embodiments, in some embodiments, each elastic module group includes two elastic modules 3 centrosymmetric about a rotation axis of the rotating frame 1.

Each groove group includes two grooves 102 centrosymmetric about the rotation axis of the rotating frame 1.

As shown in FIG. 2, two groups a total of 4 of elastic modules 3 are installed in the small round holes on upper and lower side of the shell 5. The elastic modules 3 located in the upper left small round hole and the elastic modules 3 located in the lower right small hole belong to a group of elastic modules 3. They are centrally symmetrical to each other and will be snapped into the corresponding grooves 102 at the same time. The elastic modules 3 located in the upper right small round hole and the elastic modules 3 located in the lower left small hole belong to a group of elastic modules 3. They are centrally symmetrical to each other and will be snapped into the corresponding grooves 102 at the same time.

It should be noted that providing two or more elastic modules 3 can increase the safety and stability of rotation, and avoid the situation where the device is unable to use when a single elastic module 3 is broken. With two centrally symmetrical elastic modules 3, the operational stability during rotation is improved and deflection and tilt are avoided.

In some embodiments, the position of the elastic module 3 and the groove 102 can be adjusted according to the actual volume and position. The elastic module 3 can be provided on the shell 5 and the groove 102 can be provided on the rotating frame 1; or the elastic module 3 can be provided on the rotating frame 1 and the groove 102 can be provided on the shell 5.

Alternatively, the shell 5 can be provided with an elastic module 3 and a groove 102. At the same time, the rotating frame can be provided with a groove 102 and an elastic module 3, so that the two can be connected in a targeted manner.

The above-mentioned elastic module 3 is a structure with elastic deformation ability. Through its deformation, it can be engaged or disengaged from the groove 102, so that the rotation process has a tactile prompt. Therefore, the elastic module 3 can be of many types. Based on the above-mentioned embodiments, the elastic module 3 includes a spring 302 and a ball 301, one end of the spring 302 is provided on the shell 5 or in a slot of the rotating frame 1, the other end is connected to the ball 301. When there is no external force, the ball 301 extends out of the slot for a certain distance to engage with the groove 102. During the rotation of the rotating frame 1, when the groove 102 is aligned with the spring 302, the spring 302 stretches and the ball 301 stretches out to snap into the groove 102.

Alternatively, the elastic module 3 includes a spring piece, one end of the spring piece is provided on the shell 5 or the rotating frame 1, and the other end is configured to snap into the groove 102. In some embodiments, the setting scheme of the spring piece is more suitable for the situation where the rotating frame 1 rotates in one direction.

It should be noted that the above examples only illustrate two common situations of the elastic module 3. Other types of structures that utilize elastic force to achieve snap-in positioning also fall within the scope of protection of the present application. For example, if plastic elastic protrusions are provided on one of the rotating frame 1 or the shell 5, and grooves 102 are provided on the other, the above effect can also be achieved, and similar embodiments will not be enumerated.

In order to facilitate the user's operation, the present application uses the guide limit groove 502 to limit the rotation of the rotating frame 1 within a certain angular range, and set each gear within this certain angular range. Such an arrangement not only facilitates operation, but also increases the service life of the rotating frame 1.

Figures 8, 9, 10:
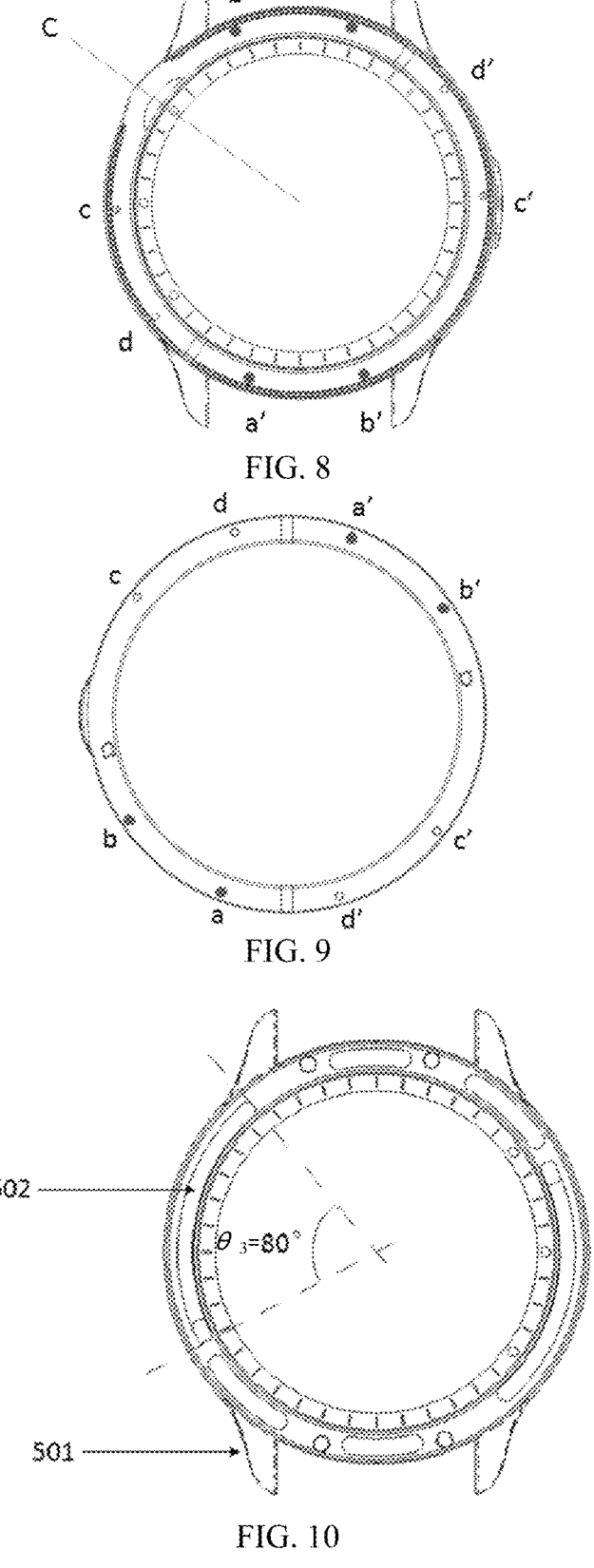
FIG. 8 is a schematic view of the electronic device when the rotating frame rotates to a gear C according to some embodiments of the present application.
FIG. 9 is a schematic view of the rotating frame when the rotating frame rotates to the gear C according to some embodiments of the present application.
FIG. 10 is a schematic view of a shell according to some embodiments of the present application.
Figures 11, 12, 13:
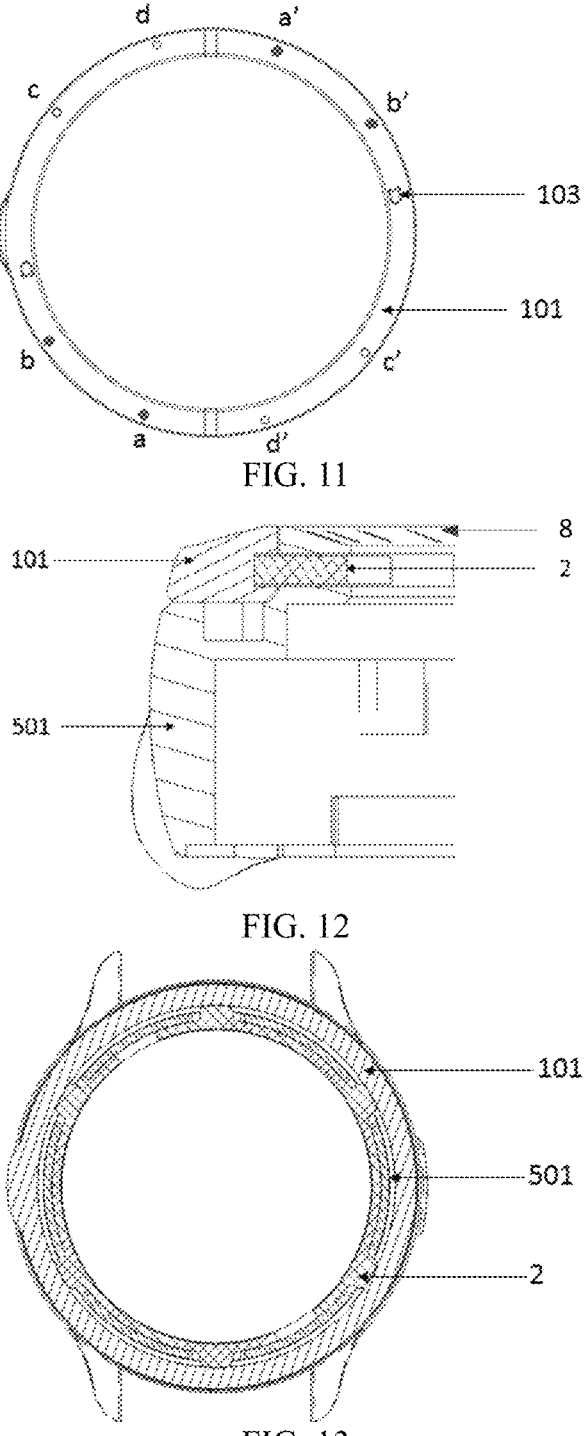
FIG. 11 is a schematic view of a side of the rotating frame for cooperating with the shell according to some embodiments of the present application.
FIG. 12 is a schematic cross-sectional view of the part of the electronic device according to some other embodiments of the present application.
FIG. 13 is a schematic front view of the shell of the electronic device according to some embodiments of the present application.

A central angle of the guide limit groove 502 is equal to a rotation central angle between two farthest gears around the rotating frame 1. As shown in FIG. 1, FIG. 10 and FIG. 11. The range of the central angle should satisfy the rotation of the rotating frame to all gears, which is determined by the rotation central angle of the rotating frame corresponding to the two gears with the furthest circumferential distance. In FIG. 10, $\theta 3$ is the central angle of rotation of the rotating frame corresponding to the two gears with the farthest circumferential distance.

In some embodiments, the curvature of the guide limit groove 502 is less than 360 degrees, or less than 180 degrees. As shown in FIG. 10 and FIG. 11, the central angle of the guide limit groove 502 around the rotating frame 1 is less than 180 degrees.

When the number of gear is small, the distance between the gears can be set closer so that the gears can be adjusted by rotating at a smaller angle to change the executed functions. Even if the total number of gear changes is relatively large, the accuracy of adjustment can still be improved by reducing the distance between gears.

In some embodiments, the central angle of rotation is 70 degrees to 90 degrees. In some embodiments, the central angle corresponding to the guide limit groove 502 can be 80 degrees, that is, within a rotation range of 80 degrees, at least two gears can be adjusted and changed.

In some embodiments, two guide limit protrusions 103 are provided centrosymmetric about a rotation axis of the rotating frame 1, two guide limit grooves 502 are provided centrosymmetric about the rotation axis of the rotating frame 1, and the guide limit protrusions 103 and the guide limit grooves 502 are snap-fitted in one-to-one correspondence.

The number of guide limit grooves 502 can be two or more, thereby improving safety. Several guide limit grooves 502 are evenly distributed in the circumferential direction of the rotating frame 1, or about the center of the rotation axis of the rotating frame 1 symmetry. Evenly distributed or centrally symmetrical arrangements are used to improve the stability and safety of the circumferential position of the guide limit groove 502.

Furthermore with such arrangement, the guide limit groove 502 and the gear limit mechanism are alternately provided along a circumferential direction of the rotating frame 1, thereby improving the stability of the structure.

Based on any one of the above-mentioned embodiments, in some embodiments, a central angle between two adjacent gears around the rotating frame 1 is configured to range from 25 degrees to 45 degrees. As shown in FIG. 1, in which the rotation angles of the rotating frame 1 corresponding to the two adjacent gears are $^{\theta}1$ and $^{\theta}2$. For electronic device with more functional requirements, the corresponding angle can be reduced so that more gears can be set in the circumferential direction. If it is an electronic device with a smaller structure, the convenience and accuracy of the control method need to be considered, and the angle between the two gears needs to be increased.

For the rotating frame 1, the friction during the rotation will affect its service life. Therefore, the service life of the rotating frame 1 can be improved by increasing the lubrication effect. In some embodiments, a side of the shell 5 facing the rotating frame 1 is provided with a lubricating piece 4 to reduce the sliding friction coefficient with the rotating frame 1.

As shown in FIG. 2 and FIG. 10, a total of four arc-shaped lubricating pieces 4 are provided on the shell 5. The shape and number of the lubricating pieces 4 can be adjusted to the actual required state, for example, they can be annular lubricating pieces 4. In some embodiments, a mounting groove is provided on the end face of the shell 5. The mounting groove has the same shape as the lubricating piece 4, and the lubricating piece 4 is provided in the mounting groove.

Based on the above-mentioned embodiments, in some embodiments, a handle 105 or an anti-slip pattern are provided on a side of the rotating frame 1 to facilitate rotating.

The handle 105 is a structure protruding from the rotating frame 1. When the rotating frame 1 is operated to rotate, the position of the handle 105 can be directly pressed. In addition, anti-slip patterns can be provided on the rotating frame 1 to increase the friction coefficient of operating the rotating frame 1, thereby facilitating rotation, and enhancing the operating experience.

In addition, marks or scales may be provided on the outer surfaces of the rotating frame 1 and the shell 5 so that the operator can control the rotating frame 1 purposefully through visual or tactile recognition. For example, marks are respectively provided on the outer surface of the rotating frame 1 and the outer surface of the shell 5 at each gear.

The above embodiment provides a solution for obtaining the rotation to a gear position through the induction of a sensor, which can be implemented through a variety of induction methods.

In some embodiments, the rotating frame 1 is provided with a magnetic component 104, the shell 5 is provided with a three-axis hall sensor 6 for detecting a rotation state of the rotating frame 1, and the hall sensor 6 is connected to the controller 7, such that the controller can switch functions through the rotation state.

The three-axis hall sensor 6 is used to detect the rotation angle, rotation direction, speed, acceleration, etc. of the rotating frame 5. The three-axis hall sensor 6 can detect the magnetic induction intensity values on the three coordinate axes in the space, and further compare it with the preset magnetic induction intensity values on the three coordinate axes to obtain the difference, and the difference can reflect the rotation state of frame 1. The controller 7 can obtain the difference and obtain the rotation position of rotating frame 1.

Regarding the setting position of the three-axis hall sensor 6, the three-axis hall sensor 6 is placed on the plane projected below the three gears. The three-axis hall sensor 6 can sense the movement state in the space by sensing the magnetic component 104 provided on the rotating frame 1. In order to prevent false triggering of slight rotation, the preset value for comparison can be set to T=200 uT, and when the above difference is greater than this value, it is considered to move to the corresponding gear. The three-axis hall sensor 6 outputs a trigger interrupt instruction to the controller 7 according to the changing state of the magnetic field, and the controller 7 executes the function corresponding to this gear.

The above-mentioned magnetic component 104 can be provided at any position on the rotating frame 1, such as at a position with a mark or a handle 105, so as to facilitate the operator's use.

Based on the above-mentioned embodiments, in some embodiments, the rotating frame 1 is sleeved on an outside of a first annular part of the shell 5, the first annular part is provided with a radial through hole, the rotating frame 1 is provided with a through hole corresponding to the radial through hole, and a collar 2 with a snap tab is detachably provided on an inner annular surface of the rotating frame 1. In an installed state, the snap tab is inserted into the through hole of the first annular part and the through hole of the rotating frame 1 in turn to limit the movement of the rotating frame 1 relative to the shell 5.

As shown in FIG. 2, FIG. 3, FIG. 12 to FIG. 14, the rotating frame 1 is sleeved inside or outside the first annular portion of the shell 5. At this time, when the two are sleeved, they can only rotate relative to each other circumferentially or move axially; when the collar 2 is installed on the two, so that the snap tab of the collar 2 penetrates into the through hole of the first annular part and the through hole of the rotating frame 1, thereby forming a radial series connection. At this time, The snap tab restricts the axial movement of the rotating frame 1 and the shell 5. Therefore, the rotating frame 1 and the shell 5 can only perform relative circumferential rotation.

It should be noted that the collar 2 does not need to be a closed annular structure, and may include several arc-shaped parts, which are provided in sequence in the circumferential direction, and their snap tabs penetrate into the through holes of the first annular part and the through hole of the rotating frame 1 at different positions in the circumferential direction. Or it can be an elastic C-shaped piece. Based on the above-mentioned embodiments, the collar 2 is an arc-shaped elastic clamping member, each collar 2 is provided with at least two snap tabs, and the at least two snap tabs are provided sequentially along an arc direction.

In some embodiments, the tension of the elastic structure is used to tighten the collar 2 on the inner or outer ring of the connecting structure of the rotating frame 1 and the shell 5, so as to limit the relative movement of the two in the axial direction. As shown in FIG. 12 and FIG. 13, the structural relationship between the rotating frame body 101, the shell body 501, and the collar 2 can be seen from the side and top cross-sectional views.

Figures 14, 15:
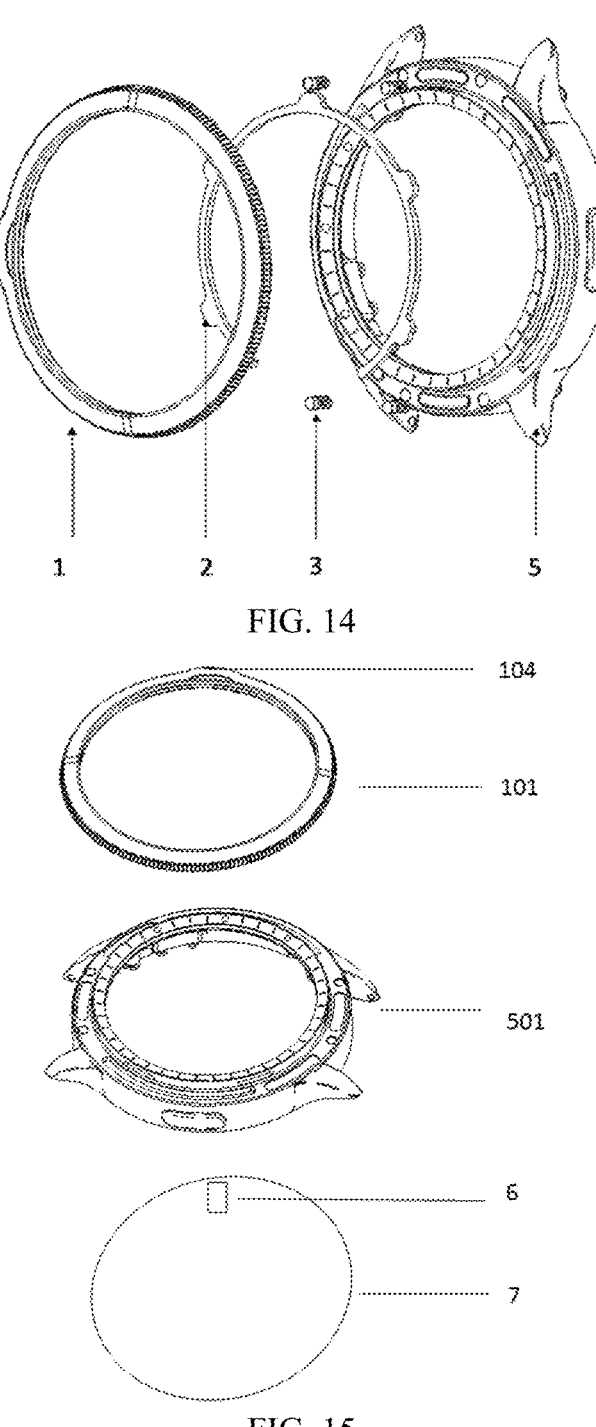
FIG. 14 is a schematic front view of the shell of the electronic device according to some other embodiments of the present application.
FIG. 15 is a schematic exploded view of a position of a three-axis hall sensor and a controller according to some other embodiments of the present application.

The above-mentioned collar 2 can be composed of several collar 2 in FIG. 2, and the two need to have a certain angle difference to enhance the stability of the connection; or it can be a collar 2 with a C-shaped structure in FIG. 14, and the C-shaped structure corresponds to a central angle of at least 180 degrees to enhance the stability of the connection.

Based on any of the above embodiments, the rotating frame 1 is provided with a physiological monitoring electrode and a rotating frame conductive member. The shell 5 is provided with a physiological monitoring circuit, and the shell 5 is provided with at least one shell conductive member connected to the physiological monitoring circuit. In response to that the rotating frame 1 rotates to a gear for physiological monitoring, the rotating frame conductive member is connected to the shell conductive member; and in response to that the rotating frame 1 rotates out of the gear for physiological monitoring, the rotating frame conductive member is disconnected to the shell conductive member. In this way, the physiological monitoring electrode and the corresponding physiological monitoring circuit can be connected or disconnected.

In some embodiments, the present application is provided with at least two physiological monitoring electrodes, at least two rotating frame conductive members and at least two shell conductive members. When the rotating frame 1 rotates to the preset position relative to the shell 5, the first rotating frame conductive member is in contact with the first shell conductive member, and the second rotating frame conductive member is in contact with the second shell conductive member, so that the first physiological monitoring electrode and the second physiological monitoring electrode are electrically connected to the physiological monitoring circuit respectively.

Alternatively, if the two physiological monitoring electrodes are of different types and they do not need to be used at the same time, they can be set to a structure in which they are not electrically connected at the same time. For example, when the rotating frame 1 rotates to the first preset position relative to the shell 5, one of the first rotating frame conductive member and the second rotating frame conductive member contacts and conducts with the corresponding shell conductive member, and when the rotating frame 1 rotates to the second preset position, the other of the two is in contact with the corresponding conductive member of the shell, so that the first physiological monitoring electrode and the second physiological monitoring electrode are electrically connected at different times, that is, the two physiological monitoring electrodes are not electrically connected to the physiological monitoring circuit at the same time.

In some embodiments, as shown in FIG. 1 and FIG. 4 to FIG. 10, the rotating frame 1 can be rotated in the angle range from A to C, and three gears A, B, and C are set between A and C, that is, they are shortcut keys of payment function, physiological monitoring function, and sports mode.

When the rotating frame 1 rotates to position A, the payment function is turned on, and the user can operate the payment function; when it is rotated to position B, the physiological monitoring function is turned on, and the user can measure electrocardiogram, body fat, blood oxygen, or heart rate, etc.; when it is rotated to the C position, the sports mode is turned on, and the user can perform outdoor, indoor, swimming and other related operations. The number and functions of shortcut keys can be set according to needs.

Whenever the rotating frame body 101 rotates to any of the gears A, B, or C, the groove 102 rotates accordingly and engages with the ball 301 of the elastic module 3 on the shell 5. The spring 302 is compressed, and the ball 301 is engaged with the groove 102 to ensure that when the rotating frame body 101 switches gears, a good tactile feedback experience is provided to the user between each gear and during the sliding process. The tactile feedback strength of the rotating frame body 101 can be adjusted through the groove 102 and the spring 302.

Figures 3, 4, 5:
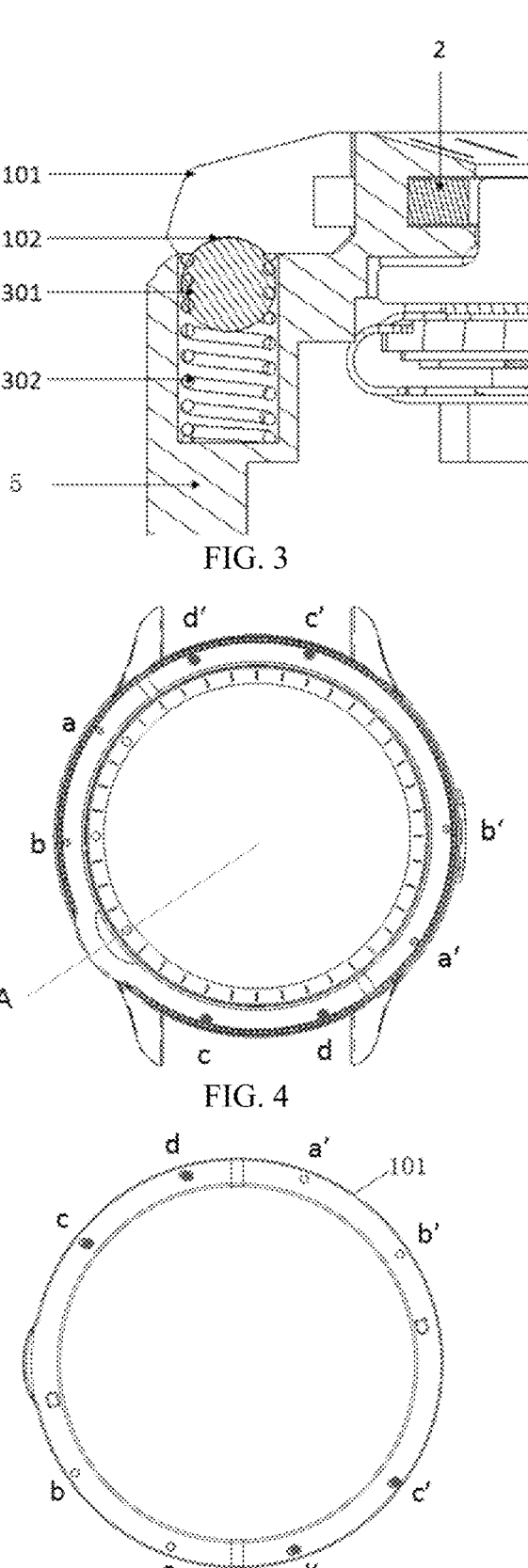
FIG. 3 is a schematic cross-sectional view of a part of the electronic device according to some embodiments of the present application.
FIG. 4 is a schematic view of the electronic device when a rotating frame rotates to a gear A according to some embodiments of the present application.
FIG. 5 is a schematic view of the rotating frame when the rotating frame rotates to the gear A according to some embodiments of the present application.

As shown in FIG. 4, four elastic modules 3 are installed at the c position, d position, c' position and d' position at 6 o'clock and 12 o'clock on the shell body 501 in the figure. When the rotating frame body 101 rotates to the A position, the grooves at the c position, d position, c' position and d' position of the rotating frame body 101 in FIG. 5 are engaged with them to realize the limit and tactile feedback of the A position.

Figures 6, 7:
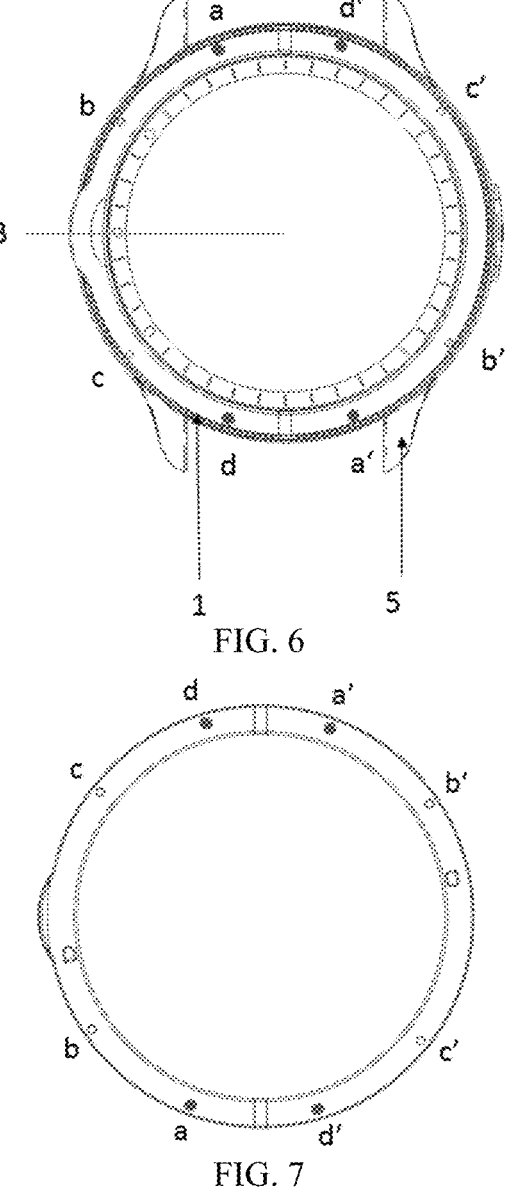
FIG. 6 is a schematic view of the electronic device when the rotating frame rotates to a gear B according to some embodiments of the present application.
FIG. 7 is a schematic view of the rotating frame when the rotating frame rotates to the gear B according to some embodiments of the present application.

As shown in FIG. 6, four elastic modules 3 are installed at a position, d position, a' position, and d' position at the 6 o'clock and 12 o'clock on the shell body 501 in the figure. When the rotating frame body 101 rotates to the B position, the grooves at the a position, d position, a' position, and d' position of the rotating frame body 101 in FIG. 7 are engaged with them to realize the limit and tactile feedback of the B position.

As shown in FIG. 8, four elastic modules 3 are installed at a positions, b positions, a' positions, and b' positions at the 6 o'clock and 12 o'clock on the shell body 501 in the figure. When the rotating frame body 101 rotates to the C position, the grooves at the a position, b position, a' position, and b' position of the rotating frame body 101 in FIG. 9 are engaged with them to realize the limit and tactile feedback of the C position.

As shown in FIG. 10 and FIG. 11, a guide limit groove 502 is provided on the shell body 501, and a guide limit protrusion 103 is provided on the rotating frame body 101. After the rotating frame body 101 is assembled to the shell body 501, the guide limit protrusion 103 is movably in the guide limit groove 502 to ensure that the rotating frame body 101 can rotate within a certain angle range.

Except for the main structure and connection relationship of the electronic device provided in the above embodiments, the structure of other parts of the electronic device can be obtained by referring to the prior art, and will not be described again here.

The above-mentioned electronic device can be a smart watch. The smart watch further includes a display screen, the display screen is provided on the shell 5, and the rotating frame 1 is a rotating annular frame arranged on the watch case to surround the display screen. The controller 7 is an intelligent controller of the smart watch, and each of the above functions corresponds to each intelligent auxiliary function of the watch.

Each embodiment in this specification is described in a progressive manner. Each embodiment focuses on its differences from other embodiments. The same and similar parts between the various embodiments can be referred to each other.

The electronic device provided by the present application has been introduced in detail above. This article uses specific examples to illustrate the principles and implementation methods of the present application. The description of the above embodiments is only used to help understand the method and its core idea of the present application. It should be noted that for those of ordinary skill in the art, several improvements and modifications can be made to the present application without departing from the principles of the present application, and these improvements and modifications also fall within the protection scope of the claims of the present application.

What is claimed is:

1. An electronic device, comprising:
a shell;
a rotating frame rotatably provided outside a part of the shell, wherein the rotating frame is configured to rotate to at least two gears relative to the shell; in response to that the rotating frame rotates to any one of the gears, the rotating frame is snap-fitted with the shell for positioning through a gear limit mechanism; and in response to that the rotating frame is rotated out of the gears by an external force, the rotating frame is released from the shell;
a guide limit mechanism comprising a guide limit groove and a guide limit protrusion slidably provided in the guide limit groove, wherein one of the guide limit groove and the guide limit protrusion is relatively fixed to the shell, and the other of the guide limit groove and the guide limit protrusion is provided on the rotating frame to limit a rotation range of the rotating frame; and
a sensor and a controller, wherein the sensor is configured to sense a current rotation gear of the rotating frame; the sensor is connected to the controller, and the controller is configured to control and perform a corresponding function according to the current rotation gear.

2. The electronic device of claim 1, wherein a lubricating piece is provided on a side of the shell facing the rotating frame.

3. The electronic device of claim 1, wherein a handle or an anti-slip pattern is provided on a side of the rotating frame to facilitate rotating.

4. The electronic device of claim 1, wherein a central angle between two adjacent gears around the rotating frame is configured to range from 25 degrees to 45 degrees.

5. The electronic device of claim 1, wherein the rotating frame is provided with a magnetic component; the shell is provided with a three-axis hall sensor for detecting a rotation state of the rotating frame, and the three-axis hall sensor is connected to the controller.

6. The electronic device of claim 1, wherein the rotating frame is sleeved on an outside of a first annular part of the shell; the first annular part is provided with a radial through hole, and the rotating frame is provided with a through hole corresponding to the radial through hole; a collar with a snap tab is detachably provided on an inner annular surface of the rotating frame, and in an installed state, the snap tab is inserted into the through hole of the first annular part and the through hole of the rotating frame in turn.

7. The electronic device of claim 6, wherein the collar is an arc-shaped elastic clamping member; each collar is provided with at least two snap tabs, and the at least two snap tabs are provided sequentially along a length direction of the arc-shaped elastic clamping member.

8. The electronic device of claim 1, wherein the rotating frame is provided with at least one physiological monitoring electrode and at least one rotating frame conductive member correspondingly connected to the at least one physiological monitoring electrode; the shell is provided with a physiological monitoring circuit, and the shell is provided with at least one shell conductive member connected to the physiological monitoring circuit;
in response to that the rotating frame rotates to a gear for physiological monitoring, the rotating frame conductive member is connected to the shell conductive member; and
in response to that the rotating frame rotates out of the gear for physiological monitoring, the rotating frame conductive member is disconnected to the shell conductive member.

9. The electronic device of claim 1, wherein the electronic device is a smart watch comprising a display screen; the display screen is provided on the shell, and the rotating frame is configured to surround the display screen.

10. The electronic device of claim 1, wherein the gears comprise a first gear for performing a first function, a second gear for performing a second function, and a third gear for performing a third function.

11. The electronic device of claim 10, wherein the first function is a payment function, the second function is a physiological monitoring function, and the third function is a sports mode.

12. The electronic device of claim 1, wherein the gear limit mechanism comprises an elastic module and a groove snap-fitted with the elastic module; one of the elastic module and the groove is provided on the shell, and the other of the elastic module and the groove is provided on the rotating frame;
the elastic module is divided into at least one elastic module group and the groove is divided into at least two groove groups to correspond to different gears; or the groove is divided into at least one groove group and the elastic module is divided into at least two elastic module groups to correspond to different gears; and
in response to that the rotating frame rotates to any one of the gears, an elastic module is snap-fitted with a corresponding groove.

13. The electronic device of claim 12, wherein each elastic module group comprises two elastic modules centrosymmetric about a rotation axis of the rotating frame; and
each groove group comprises two grooves centrosymmetric about the rotation axis of the rotating frame.

14. The electronic device of claim 12, wherein the elastic module is provided on the shell, and the groove is provided on the rotating frame; or
the elastic module is provided on the rotating frame, and the groove is provided on the shell.

15. The electronic device of claim 12, wherein the elastic module comprises a spring and a ball; one end of the spring is provided on the shell or in a slot of the rotating frame, and the other end of the spring is connected to the ball; the ball is configured to snap into the groove; or
the elastic module comprises a spring piece; one end of the spring piece is provided on the shell or the rotating frame, and the other end of the spring piece is configured to snap into the groove.

16. The electronic device of claim 1, wherein the guide limit groove and the gear limit mechanism are alternately provided along a circumferential direction of the rotating frame.

17. The electronic device of claim 1, wherein a central angle of the guide limit groove is equal to a rotation central angle between two farthest gears around the rotating frame.

18. The electronic device of claim 1, wherein two guide limit protrusions are provided centrosymmetric about a rotation axis of the rotating frame, and two guide limit grooves are provided centrosymmetric about the rotation axis of the rotating frame; the guide limit protrusions and the guide limit grooves are snap-fitted in one-to-one correspondence.

* * * * *